United States Patent [19]
Kaiser

[11] Patent Number: 5,322,534
[45] Date of Patent: Jun. 21, 1994

[54] SELF-CLEANING UPSIDE-DOWN AIR FILTER

[76] Inventor: David M. Kaiser, 1403 Woodland Dr., Santa Paula, Calif. 93060

[21] Appl. No.: 16,756

[22] Filed: Feb. 11, 1993

[51] Int. Cl.⁵ .................. B01D 29/17; B01D 29/70
[52] U.S. Cl. .............................. 55/283; 55/288; 55/293; 55/304; 55/378
[58] Field of Search ............. 55/96, 97, 282, 288, 55/293, 304, 305, 361, 373, 378

[56] References Cited

U.S. PATENT DOCUMENTS

| | | | |
|---|---|---|---|
| 1,458,720 | 6/1923 | Malone | 55/288 |
| 1,761,377 | 6/1930 | Waring | 55/304 |
| 2,069,703 | 2/1937 | Fisker | 55/376 |
| 2,266,976 | 12/1941 | Leathers | 55/305 X |
| 2,295,984 | 9/1942 | Wilson | 55/288 |
| 2,951,553 | 9/1960 | Kirby | 55/378 X |
| 3,320,725 | 5/1967 | Foster | 55/293 X |
| 3,771,664 | 11/1973 | Schrink et al. | 55/373 X |
| 3,853,517 | 12/1974 | Mitchell | 55/304 X |

FOREIGN PATENT DOCUMENTS

| | | | |
|---|---|---|---|
| 908627 | 4/1946 | France | 55/304 |
| 425633 | 10/1974 | U.S.S.R. | 55/304 |
| 622483 | 7/1978 | U.S.S.R. | 55/378 |
| 1386250 | 4/1988 | U.S.S.R. | 55/304 |
| 1430071 | 10/1988 | U.S.S.R. | 55/304 |
| 1505568 | 9/1989 | U.S.S.R. | 55/304 |

Primary Examiner—Robert Spitzer
Attorney, Agent, or Firm—Gene W. Arant

[57] ABSTRACT

A self-cleaning air filter is formed by placing a flexible filter bag in an upside-down position with its open end firmly supported. Air to be cleaned is pulled upwardly through the bag. When the air stream is shut off, the bag collapses, discharging accumulated particulate material into the space beneath it.

7 Claims, 1 Drawing Sheet

SELF-CLEANING UPSIDE-DOWN AIR FILTER

BACKGROUND OF THE INVENTION

There are many situations in which atmospheric air is filtered while being brought into an enclosed space. Commercial buildings are a prominent example. Homes and vehicles are other examples.

Some kind of mechanical air filter is generally used, which accumulates the particulate material that is taken from the air. In commercial buildings in particular, it is a fairly universal practice to shut down the air circulation system from time to time, thus discontinuing the inflow of atmospheric air. A need then arises for periodic cleaning of the air filter, and also for disposing of the particulate material. This type of maintenance often requires hand labor. And if the maintenance were to be automated, a complex system of apparatus would be required.

SUMMARY OF THE INVENTION

According to the present invention a method is provided for cleaning an air filter and disposing of its accumulated particulate material without human intervention or complex apparatus.

In accordance with the invention a filter bag made of flexible media material is supported in a vertically extending upside-down position, with its open end directed downwardly and elevated so as to leave a space beneath it through which the outside air may enter the bag. A vacuum force is then applied to the outer or down stream surface of the bag to draw outside air into the open end and through the bag. When the intake of outside air is interrupted, the open end of the bag continues to be supported in its elevated position while its side walls and closed bottom end are allowed to collapse downwardly, thus dislodging the accumulated particulate material and causing it to fall into the space beneath the open end of the bag.

Reliance is then placed upon the surrounding atmosphere to take away that which it had brought. This is accomplished by maintaining the interruption of the air intake for a sufficient period of time that at least a portion of the thus dislodged particulate material is returned to the surrounding atmosphere. It will be noted that in the normal operation of commercial buildings this result will occur naturally, since the air circulation system is usually turned off all night.

Thus, the object and purpose of the present invention is to provide an air filter which automatically cleans itself when the associated air circulation system is turned off.

DRAWING SUMMARY

FIG. 3 is a schematic elevation view showing the filter bag being returned to its operative position when air circulation is turned on.

DETAILED DESCRIPTION

Figure 1:
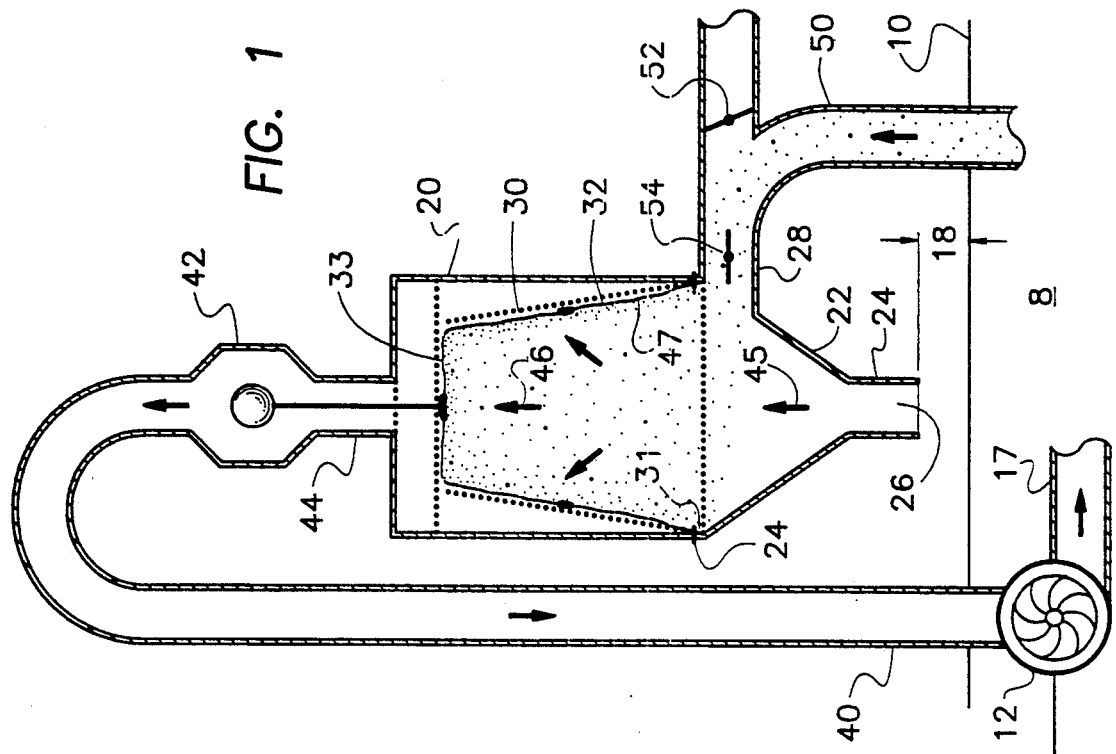
FIG. 1 is a schematic elevation view of an air circulation system incorporating a novel air filter in accordance with my invention.

Referring now to the drawings, for convenience in illustration my invention is shown as being utilized in conjunction with the roof of a building. Filtered and cleaned air is provided to the enclosed space 8 of the building. A horizontal line 10 represents the roof, above which an air filter is installed. A housing 20 is supported in spaced relation above the roof 10, and a filter bag 30 is supported inside the housing. An air inlet line 40 extends upward above the housing 20, then downward through the roof 10 to the interior space 8 of the building. A fan 12 located inside the building draws air through the passageway 40 and into the building space 8 via a passageway 17. Fan 12 is driven by a motor 14, which is in turn controlled by a switch 16.

The filter bag 30 is made of a flexible filter media material. It is supported in a vertically extending, upside-down position with its closed end 33 (which would normally be called the bottom end) directed upwardly, while its open end 31 (which would normally be called the top end) is directed downwardly. A fastening means 29 is utilized to secure the open end 31 of the bag 30 to the interior circumference of housing 20 at a fixed elevation above the roof 10.

Housing 20 has a downwardly depending portion 22, which extends below the elevation of the bag open end 34, but which at the same time is spaced a distance 18 above the roof 10. Depending portion 22 of the housing may be tapered in a funnel-like shape, as shown, and terminates in a tubular portion 24 with inlet opening 26. In the normal operation of my filter atmospheric air is pulled through the space 18 and thence as shown by arrow 45 through the lower housing portion 22, upward into and through the open end 31 of the bag 30. The air then flows through the bag, being pulled from the down stream side of the bag by fan 12 acting through the air inlet line 40. As a result, particulate material is collected on the inner surface of bag 30, usually in the form of a dust cake 47 and the air passing through the bag and hence through passageway 17 into the interior of the building is relatively clean air.

A perforated frame 21 is supported inside and from the housing 20 and spaces the side walls 32 and bottom wall 33 of the filter bag 30 away from the walls of the housing. The upward movement of air inside the housing 20 as indicated by arrow 46 keeps the bag 30 expanded against the perforated frame 21, so as to permit the necessary air flow through the bag and upward into and through the passageway 40.

As an adjunct of my new filter, an economizer 54 may be used as shown in FIG. 1. An air return line 50 provides a passageway for used or dirty air that is either to be cleaned and recirculated, or to be taken out of the building and returned to the atmosphere. A back draft damper 52 associated with the line 50 provides a one-way valve action so that the dirty air can be returned to the atmosphere, while new outside air is prevented from entering at that location. A tube 28 extends from the upper part of lower housing portion 22 to return line 50, and contains an economizer 54, which is a valve that can be controlled by a relay, not shown, to either permit or deny air flow.

When the economizer valve 54 is closed, the dirty air is required to be dumped back into the atmosphere through the back draft damper 52. At the same time, new air is brought in through space 18 and air inlet opening 26 into the lower housing 22 as previously described, and is cleaned in passing through the filter bag 30 before entering the building via passageway 17. This mode of operation is used if the building is too hot and the outside air is cool. Excess heat is then discharged through the back draft damper 52 along with the dirty air, while cooler air is brought in through housing 22.

If it is desired to conserve heat, then economizer valve 54 is kept open, and the dirty air being exhausted from the building is passed through the filter bag 30 for re-cleaning. It is in this phase of the operation that it is helpful to have the funnel-shaped configuration of lower housing portion 22, because a limited amount of new air will be brought in from the space 18 through tube 24 and at the same time a limited amount of the dirty (and hence, already heated) air will be lost through damper 52.

Figure 2:
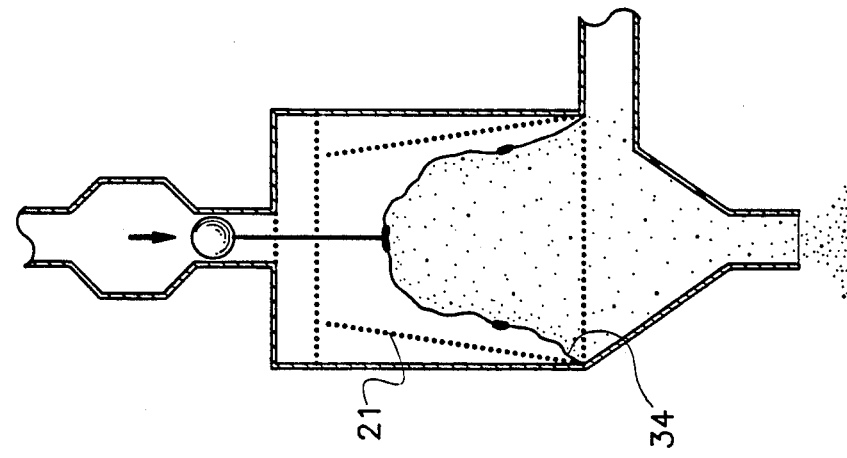
FIG. 2 is a schematic elevation view showing the collapse of the filter bag when the air circulation system has been turned off.

When the switch 16 is opened and the air circulation is turned off, the side walls and bottom wall of the filter bag 30 are then no longer supported by the air flow. The filter bag then collapses downwardly as shown in FIG. 2. Depending upon a variety of factors such as the characteristics of the filter media material, the nature of the particulate material, and the length of time the filter has been operating, the bag weighted with an internal cake 47 of accumulated particulate material may collapse very readily. On the other hand, in some situations it may be necessary or advisable to attach weights to the bag, such as the weights 35, 36, and 37 shown in FIG. 2. These weights are attached in physically separated locations on the down stream surface of the bag, so that the bag may readily fold, thus breaking the cake and causing the particulate material to drop off.

The particulate material then drops down into lower housing portion 22 through tube 24 and onto the roof 10. Since the air circulation system will normally be off for several hours, any passing breeze will suffice to return the accumulated dust on roof 10 to the atmosphere from whence it came.

When the air circulation is again turned on, it is desired to have the bag 30 again pulled up to its elevated and extended position as shown in FIG. 1. Depending upon a variety of factors such as the characteristics of the filter media material, the nature of the particulate material, and the length of time the filter has been operating, the bag may return to its extended position very readily. In some situations, however, it may be necessary or desirable to provide an auxiliary means to ensure the expansion of the bag to its desired location.

Figure 3:
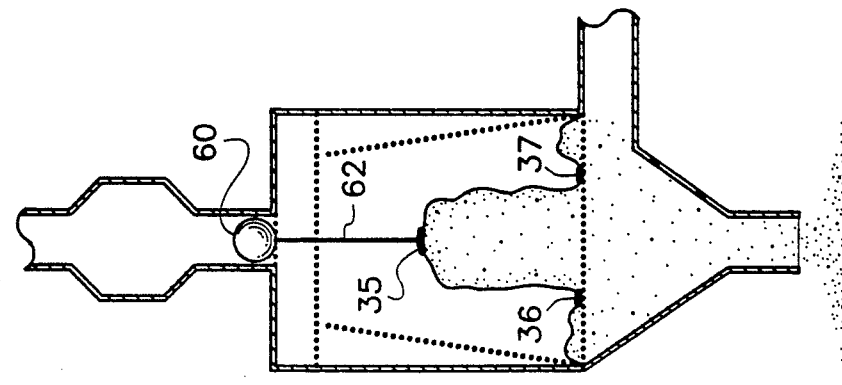

Therefore, air inlet line 40 may be provided with an enlarged passageway portion 42 which is a fixed distance 44 above the top of housing 20. A float 60 is also provided, which may be in the form of an inflated ball. A flexible cable 62 then has one end attached to the float 60 while its other end is attached to the center of the bottom wall 33 of the bag. Cable 62 is of such length that, in the collapsed position of the bag as shown in FIG. 2, float 60 occupies passageway 44 which extends above housing 20 to passageway 40. Upward air flow then causes the float 60 to move upward as shown in FIG. 3, until it reaches the enlarged passageway portion 42. The air stream then flows freely around the float 60 on all sides, and the strength of the air flow is then sufficient to cause the bag to resume its fully expanded position as shown in FIG. 1.

Although air inlet 26 provides access to the housing 20, it will be understood that the open end 31 of the bag 30, since it remains fixed in an open position, provides an air inlet for the filter bag.

Although "atmospheric air" is referred to, such may be the air in a surrounding space, whatever that may be.

It is apparent that alternative means may be employed to ensure the collapse of the bag, i.e., utilizing a media material which has a rather high weight per unit of area but also has a high degree of flexibility.

A presently preferred embodiment of the invention has been disclosed in complete detail in order to comply with requirements of the patent laws. However, the scope of the invention is to be measured only in accordance with the appended claims.

What I claim is:

1. A self-cleaning filter for cleaning particulate material from the air, comprising:

a filter bag made of flexible, porous filter media material, being normally disposed upside-down with its closed end extending upwardly and its open end extending downwardly;

means secured about the periphery of said open end of said filter bag so as to keep it open and thereby provide an air inlet opening;

means for propelling a flow of air into said air inlet opening and thence vertically upward such that the air entering said air inlet opening flows through the walls of said bag and out its down stream surface and deposits particulate material on the inner surfaces thereof;

a housing extending about said securing means and said filter bag and having an air outlet;

means for selectively de-energizing said propelling means so that the flow of air into said bag is discontinued and said bag collapses downwardly toward said air inlet opening, thereby causing particulate material to become dislodged from the inner surfaces of said bag and dumped below said air inlet opening;

means responsive to a resumption of air flow through said filter bag for retracting said filter bag in an upward direction; and said automatic retracting means including an air passageway extending outward from said air outlet and having an enlarged portion at a fixed length from said air outlet, a float movably positioned within said fixed length of said passageway, means coupling said float to said bag, and said coupling means being of a fixed length such that said float after lifting said bag then moves into said enlarged portion of said passageway so as to permit a free flow of air around it.

2. A self-cleaning filter as claimed in claim 1 wherein said filter bag has a plurality of weights secured thereon in mutually separated locations so as to provide an additional gravitational driving force for causing said bag to collapse.

3. A self-cleaning filter as claimed in claim 2 wherein said coupling means includes an elongated flexible member coupling said float to said closed end of said bag.

4. A self-cleaning filter as claimed in claim 1 wherein said coupling means includes an elongated flexible member coupling said float to said closed end of said bag.

5. A self-cleaning filter as claimed in claim 1 wherein said housing has a lower end of funnel-shaped configuration, and which further includes an economizer coupled to the upper end of said funnel-shaped lower housing portion, so that dirty and previously heated air may enter said filter through said economizer while at the same time a limited amount of atmospheric air is brought into the lower extremity of said lower housing portion.

6. A self-cleaning filter for cleaning particulate material from the air, comprising:

a filter bag made of flexible, porous filter media material;

a vertically extending housing having a circumferential wall which is substantially impervious to the flow of air, a lower end with an air inlet opening therein, and an upper end with an air outlet therein;

means for propelling the flow of air into said air inlet opening and thence vertically upward within said housing and into and through said air outlet;

said filter bag being normally disposed within said housing in an upside-down position with its closed end extending upwardly within said housing and its open end secured to the periphery of said air inlet opening, such that the air entering said opening then flows through the walls of said bag, thus depositing particulate material on the inner surfaces of said bag;

means for selectively de-energizing said propelling means so that the flow of air into said bag is discontinued and said bag collapses downwardly toward said air inlet opening, thereby causing the particulate material to become dislodged from the inner surfaces of said bag and dumped below said housing;

means for automatically retracting the closed end of said filter bag upwardly within said housing after said particulate material is dumped below said housing, said automatic retracting means including an air passageway of generally fixed diameter extending outward from said air outlet of said housing, an enlarged portion of said passageway at a fixed length from said air outlet, a float movably positioned within said fixed length of said passageway, an elongated flexible member coupling said float to said closed end of said bag for lifting said bag upon the resumption of air flow upwardly within said housing; and said elongated flexible member being of such length that said float then moves into said enlarged portion of said passageway and hence no longer obstructs the flow of air.

7. A self-cleaning filter for cleaning particulate material from the air, comprising:

a filter bag made of flexible, porous filter media material;

means normally supporting said bag in an upside-down position with its closed end extending upwardly and its open end defining an air inlet opening such that air entering said lower open end then flows through the walls of said bag and deposits particulate material on the inner surfaces of said bag;

means for propelling air into said air inlet opening;

means for selectively de-energizing said propelling means so that the flow of air into said bag is discontinued and said bag collapses downwardly toward said air inlet opening, thereby causing the particulate material to become dislodged from the inner surfaces of said bag and dumped below said bag; and means for automatically retracting the closed end of said filter bag upwardly when the flow of air into said air inlet opening is resumed, including an air passageway having a portion thereof of generally fixed diameter extending above said bag, a float movably positioned within said fixed diameter passageway portion, said passageway being enlarged above said fixed diameter portion, an elongated flexible member coupling said float to said closed end of said bag for lifting said bag upon the resumption of air flow upwardly within said bag, and said elongated flexible member being of such length that said float then moves into the enlarged portion of said passageway and hence no longer obstructs the flow of air.

* * * * *